United States Patent
Logvinov et al.

(10) Patent No.: US 10,015,449 B2
(45) Date of Patent: Jul. 3, 2018

(54) METHOD AND APPARATUS FOR MANAGING PROVISIONING OF AN IMAGING SYSTEM

(71) Applicant: STMicroelectronics, Inc., Coppell, TX (US)

(72) Inventors: Oleg Logvinov, East Brunswick, NJ (US); James D. Allen, Rochester, NY (US)

(73) Assignee: STMicroelectronics, Inc., Coppell, TX (US)

( * ) Notice: Subject to any disclaimer, the term of this patent is extended or adjusted under 35 U.S.C. 154(b) by 297 days.

(21) Appl. No.: 14/514,132

(22) Filed: Oct. 14, 2014

(65) Prior Publication Data

US 2015/0103165 A1    Apr. 16, 2015

Related U.S. Application Data

(60) Provisional application No. 61/890,042, filed on Oct. 11, 2013.

(51) Int. Cl.
   *H04N 7/18* (2006.01)
   *H04N 5/232* (2006.01)

(52) U.S. Cl.
   CPC ......... *H04N 7/181* (2013.01); *H04N 5/23203* (2013.01); *H04N 5/23206* (2013.01)

(58) Field of Classification Search
   CPC .... H04N 7/181; H04N 1/00114; H04N 5/232; H04N 5/23203; H04N 5/23206; G06K 9/6202
   See application file for complete search history.

(56) References Cited

U.S. PATENT DOCUMENTS

| | | | |
|---|---|---|---|
| 7,134,016 B1 | 11/2006 | Harris | |
| 7,454,041 B2 | 11/2008 | Sukegawa et al. | |
| 7,768,380 B2 | 8/2010 | Breed et al. | |
| 8,302,166 B2 | 10/2012 | Balakrishnan et al. | |
| 2010/0283586 A1* | 11/2010 | Ikeda | H04N 1/00007 340/10.42 |
| 2011/0256886 A1* | 10/2011 | Velusamy | G01S 5/0009 455/456.1 |
| 2012/0287290 A1* | 11/2012 | Jain | H04L 63/18 348/207.1 |
| 2013/0015946 A1* | 1/2013 | Lau | G07C 9/00 340/5.2 |
| 2013/0127591 A1* | 5/2013 | Shay | G07C 9/00087 340/5.52 |
| 2013/0194428 A1* | 8/2013 | Chao | G01C 21/20 348/159 |

(Continued)

*Primary Examiner* — Sathyanaraya V Perungavoor
*Assistant Examiner* — Peet Dhillon
(74) *Attorney, Agent, or Firm* — Slater Matsil, LLP (57) ABSTRACT

Embodiments of the present disclosure include a system and a method of accessing a system. An embodiment is a system including an imaging system including a controller and a first camera, the controller having a communication connection configured to transmit or receive content or control signals, and a mobile device including a second camera, the mobile device having a communication interface configured to transmit or receive content or control signals with the controller, the controller being configured to compare images from the first and second cameras to allow access to the controller from the mobile device.

28 Claims, 7 Drawing Sheets

(56) References Cited

U.S. PATENT DOCUMENTS

| | | | |
|---|---|---|---|
| 2013/0265426 A1* | 10/2013 | Fan | G07B 15/02 348/148 |
| 2014/0049653 A1* | 2/2014 | Leonard | G06T 1/0042 348/207.1 |
| 2015/0334285 A1* | 11/2015 | Zhang | H04N 5/23222 348/211.2 |

* cited by examiner

METHOD AND APPARATUS FOR MANAGING PROVISIONING OF AN IMAGING SYSTEM

CROSS REFERENCE TO RELATED APPLICATIONS

The present application claims priority to U.S. Provisional Application Ser. No. 61/890,042, entitled "Method and Apparatus for Managing Provisioning of an Imaging System," filed on Oct. 11, 2013, which application is hereby incorporated by reference herein in its entirety.

TECHNICAL FIELD

This invention relates generally to imaging systems, and more particularly to a method and apparatus for installing and maintaining distributed imaging systems using a mobile device with image capability.

BACKGROUND

Imaging systems utilizing cameras are often in remote locations. This can create problems when the installer is attempting to securely access the camera and/or system to install and modify the parameters of the camera and/or system. This may require additional people or expensive remote control fixtures to install/modify the system peripherals. A better solution is needed, especially for small business or home applications with limited resource and budgets.

SUMMARY OF THE INVENTION

An embodiment is a system including an imaging system including a controller and a first camera, the controller having a communication connection configured to transmit or receive content or control signals, and a mobile device including a second camera, the mobile device having a communication interface configured to transmit or receive content or control signals with the controller, the controller being configured to compare images from the first and second cameras to allow access to the controller from the mobile device.

Another embodiment is a method of a mobile device accessing a system, the method including attempting access of a controller of the system by the mobile device, capturing a first scene using a first camera on the mobile device, sending the captured first scene to the controller, capturing the first scene using a second camera in the system, and authenticating the mobile device based on the captured images of the first scene from the first camera and the second camera.

A further embodiment is a method of accessing a system, the method including attempting access of a first camera in the system by a mobile device, capturing a first scene using a second camera on the mobile device, capturing a second scene using the first camera in the system, authenticating the mobile device based at least partially on the captured images of the first and second scenes.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present disclosure will be described with respect to embodiments in a specific context, namely method and apparatus for installing and maintaining distributed imaging systems using a mobile device with image capability. Embodiments of this invention may also be applied to other systems, such as, but not limited to, security systems such as security systems with security cameras.

Before addressing illustrative embodiments of the present disclosure in detail, various embodiments and advantageous features thereof will be discussed generally. For example, several of the contemplated embodiments provide advantageous features that include a mobile device (sometimes referred to but not limited to a mobile phone or a smart phone in the present disclosure) to obtain access to a controller for an imaging system, which may provide a simple and secure means for provisioning access to the components and/or functions of the imaging system such as, if present, a system controller, system cameras, imaging system settings and preferences, etc.

Today, mobile devices (e.g. smart phones and tablets) not only support multiple communications mediums, but also are capable of running programs and applications (local, remote, and "thin client" programs). Mobile devices contain may features including image capability such as one or more still cameras and/or one or more video cameras. Mobile devices also include location and orientation data features, such as global positioning system (GPS) receivers, Wi-Fi location sensors, direction sensors, azimuth sensors, altitude sensors, other orientation and location sensors, the like, or any other suitable means of obtaining location and orientation data. Thus, the current system may utilize a mobile device to remotely control and access the system controller. An application on the mobile device can be used to remotely control operation of the system and/or enter installation parameters over a communications medium connected between them.

The disclosure provides solutions for problems associated with the authorization of access to imaging systems. In this method, a mobile device is used to connect to an imaging system by a communications means. The mobile device is then used to capture an image. The imaging system then utilizes a system camera to capture an image, retrieve location data from the mobile device, retrieve orientation data from the mobile device, or a combination thereof within a time window specified by the imaging system. In some embodiments, the location data from the mobile device may be included in the mobile device's image metadata, such as the location tags used in exchangeable image file format (Exif) images. The data from the images and the location/position/orientation data is then compared and if the data matches, access to the imaging system are permitted to the mobile device. The data comparison may be performed locally on a system controller, remotely on a "cloud-based" system, or a combination thereof. In some embodiments, the mobile device directly accesses the system camera and the mobile device and/or the system camera acts as the controller to provision access to the system camera. For example, the system camera may be an internet protocol (IP) camera allowing the mobile device to directly access the IP camera with the mobile device providing the functions of the controller in an application running on the mobile device. In some embodiments, the data comparison includes processing images and data to derive meaningful analytics data such as facial analytics data, location analytics data, orientation analytics data, the like, or a combination thereof.

In some embodiments, the access provisioning of the imaging system does not require libraries of stored images. In these embodiments, the imaging system uses new images and data captured during a same or a substantially same time period, and thus, the images and data may become a security nonce: temporary and ethereal data that is not subject to spoofing with, for example, stored images and data. Consequently, this imaging system does not require passwords, special test tools, and other devices that could be misused, lost, stolen, or otherwise need to be maintained and managed. Furthermore, the imaging system provides simple and secure authorization that is time-dependent and/or situation-dependent, that is, each access may be secured, in order to avoid issues with lost/stolen mobile devices or untrustworthy or past employees.

For example, when a system technician, a consumer, or a user (referred to as an operator hereinafter) has made all of the physical and electrical connections, there are additional functions that may need to be set up such as, the video camera may need to be positioned, or the contrast and exposure settings might need to be adjusted. In many instances, these adjustments are made by the operator who has to keep moving between the devices that have to be adjusted and, if local, the system controller. Hence, remote access to the system camera settings, the system camera captured video/images, and the system controller settings/data would greatly increase the efficiency and effectiveness of the operator.

FIGS. 1A through 1D illustrate embodiments of imaging systems that provide this efficiency and effectiveness by implementing a method of imaging system authorization and/or provisioning. A mobile device 100 having elements including an interactive touch sensitive display 105, at least one digital camera 110, one or more communications connections 115, a location data component, an orientation data component, one or more processors, memory, a power source, and other elements necessary to support application programs (not shown). The mobile device 100 may be a mobile phone, such as a smart phone, a tablet, a laptop, or the like. The location data component may include a GPS receiver, a Wi-Fi transceiver, the like, or a combination thereof. In some embodiments, the location data component may utilize known wireless access points, network segments, wireless beacons, the like, or a combination thereof to determine the location of the mobile device 100. The orientation component may include a compass, an accelerometer, a gyroscope, the like, or a combination thereof.

The imaging system 300 may include keypads 315, a controller 310, one or more displays/monitors 305, and one or more cameras 320. The keypads 315 (such as a keyboard) are used to control access to the controller 310 and for interfacing to the imaging system 300. In an embodiment, the controller 310 is a digital computer system that is includes, for example, communications connections 115, one or more processors, memory, a power supply, and is capable of running software applications (not shown) such as an image comparison program 325. In some embodiments, the controller 310 is a cloud-based controller, and in some embodiments, the controller 310 is a local controller. The cameras 320 may be still cameras, video cameras, or a combination thereof. In some embodiments, the cameras 320 are IP cameras that can send and receive the image data over a wired or wireless connection, such as Ethernet and Wi-Fi. The cameras 320 may be are located throughout an area. For example, the cameras 320 may be located throughout a building, a neighborhood, a city, the like, or a combination thereof. The displays 305 are for user interaction and display of system information and data. In an embodiment, the imaging system 300 is a surveillance system 300 with surveillance cameras 320.

Figure 1A:
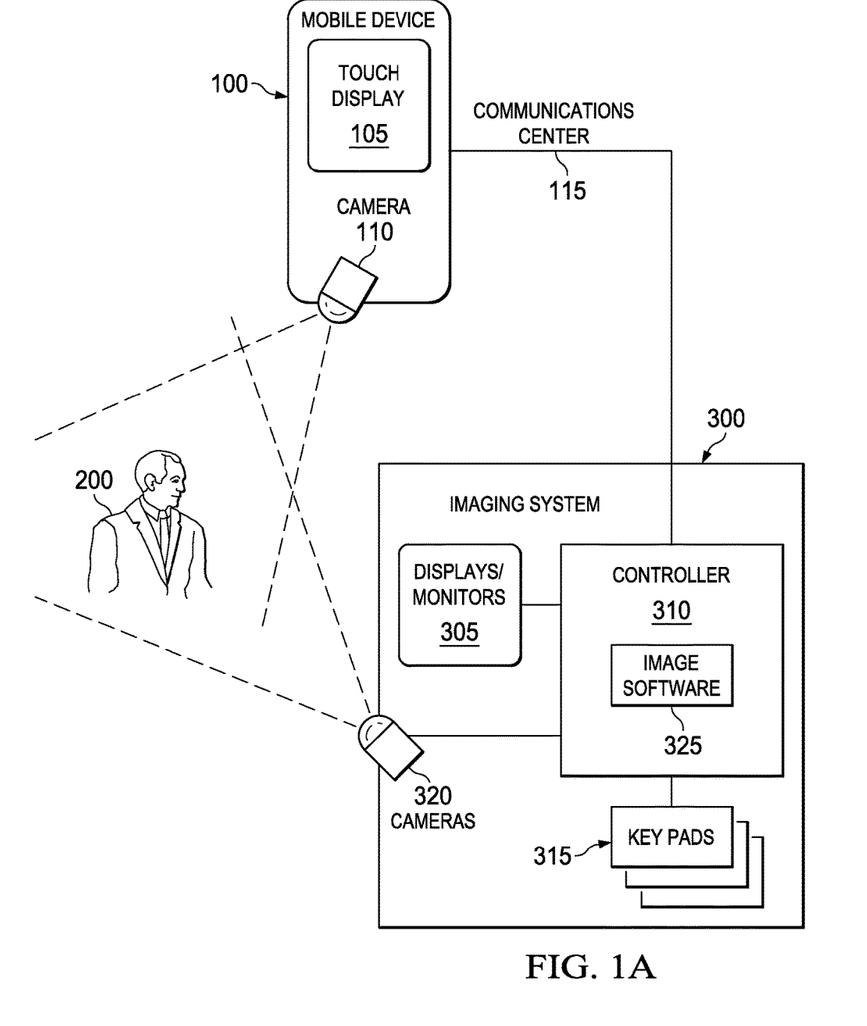
FIG. 1A illustrates an imaging system capturing similar images for provisioning access to the imaging system in accordance with an embodiment.
Figure 2A:
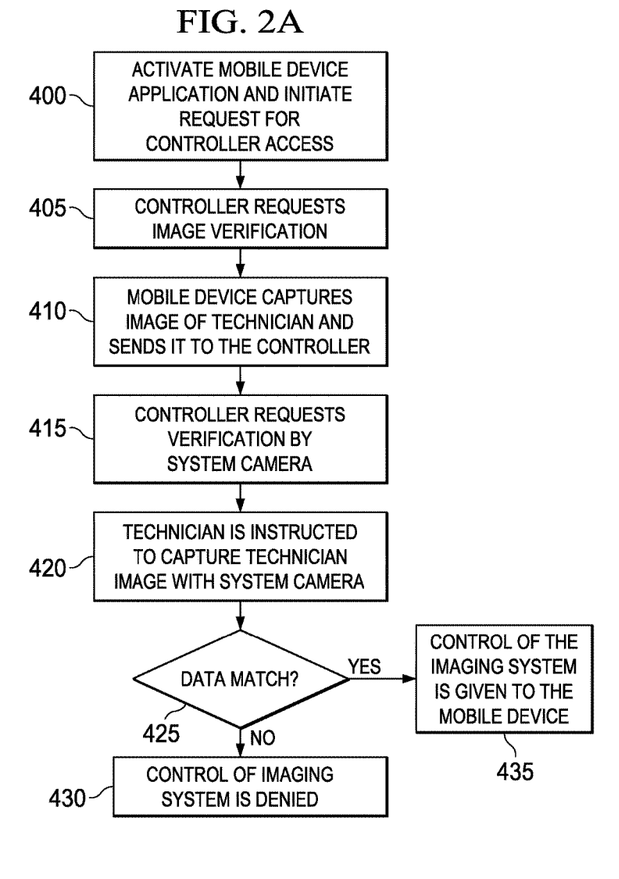
FIG. 2A illustrates a process flow diagram of a method of operating an imaging system in accordance with an embodiment.

FIG. 1A illustrates an imaging system 300 capturing similar images for provisioning access to the imaging system in accordance with an embodiment and FIG. 2A illustrates a process flow of operating the imaging system in FIG. 1A in accordance with an embodiment.

The mobile device 100 and the controller 310 may be used to provision access to the imaging system 300. For example, an operator may want to have access to modify settings of the imaging system 300 and, in some embodiments, specifically to access a camera 320 of the imaging system 300. The operator initiates a specific application on a mobile device 100 that is designed to contact the controller 310 and requests access to the imaging system 300 (step 400). The connection may be made over a variety of communications interfaces 115 that are found in a mobile device such as Wi-Fi, Ethernet, powerline communications, infrared, Bluetooth, various cellular communications technologies, the like, or a combination thereof. The controller responds by requiring an authentication process from the operator (step 405). In an embodiment, the authentication process requires the operator to use the camera 110 of the mobile device 100 to capture an image. In this embodiment, the image that the operator captures with the mobile device 100 is an image of the operator and the operator sends that image to the controller 310 (step 410). The controller then requests verification by a specific one of the system cameras 320 (step 415). In an embodiment, the mobile device 100 application instructs the operator to capture the same image with the specific camera 320 that was previously captured by the mobile device 100 (step 420). The operator may utilize the touch screen to see what the specific camera 320 sees and use this to aim and capture the desired image for comparison. In some embodiments step 420 may effectively be skipped and the controller 310 uses the system camera 320 to capture the image without any intervention from the operator.

The two captured images are compared and/or the time data, location data, and/or orientation data from the images is compared to see if they fall within a programmable period (step 425). The comparison of images may be made within the controller 310 or externally on a distributed service such as a network image analysis server. In an embodiment, the image comparison function is performed within the controller 310 to avoid security issues with making the decision outside of the system. This also avoids the cost and need to connect to these services during the installation. In an embodiment, the process includes multiple opportunities and choices of image scenes to keep the system secure but simple and easy to use. If the captured images and time period meet the threshold of acceptability, access is given to the mobile device 100 and the controls of the imaging system 300 are available on and from the mobile device 100 (step 435). If a match is not made, access is denied (step 430).

In this embodiment, the scene 200 captured by the camera 320 is an image of the operator who is near the camera 320, which is substantially the same image captured by the mobile device 100. In some other embodiments, the scene 200 to be captured by the camera 320 may be different from the scene captured by the mobile device. For example, in some embodiments, the camera 320 may be high up on a building and the camera 320 cannot see the operator well enough for an image comparison, in these embodiments, the data comparison may utilize other parameters. For example, the controller 310 may also utilize timestamps of the captured scenes, location-based information from the mobile device 100, biometric data from the operator, or any other suitable information to enhance the authentication process. Based on the results of the authentication process, the operator is either provided access or denied access to the imaging system 300.

In this embodiment, where the mobile device 100 and system camera 320 capture an image of a person, the capture images may include a face; however, partial face, body parts such as fingerprints, or other uniquely identifiable parts of the person are also among the contemplated embodiments. In an embodiment, the images are videos and the imaging system 300 can detect the pulse of the person in the video due to the color change in the person's face and/or the pulsing movement of the person's veins. In this embodiment, the data comparison may check to see if the pulse of the person in the video taken by the mobile device 100 is in sync with the pulse in the video of the person taken by the system camera 320. If the pulses are in sync, the operator is provided access to the imaging system 300. In another embodiment, the images are videos and the imaging system 300 can instruct a camera flash on the mobile device 100 to flash in a predetermined pattern and can detect the pattern of the camera flash in one of the system cameras 320. In this embodiment, the data comparison may check to see if the pattern of the camera flash of the mobile device 100 in the video taken by the system camera 320 is in sync with the predetermined pattern that was provided by the imaging system 300.

In some embodiments, at least one of the scenes captured by the mobile device 100 and/or the system camera 320 is a background scene, images of the mobile device itself, or other uniquely identifiable objects are also among the contemplated embodiments. The controller 310 and/or mobile device application may request the mobile device 100 to send location-based information such as its GPS location. In an embodiment, the operator is installing/maintaining a specific camera 320 and the mobile device application requests the location or ID of the specific camera 320 from the operator and/or mobile device 100.

Examples of the controls and functions available the mobile device 100 once the imaging system 300 is accessed may include a system camera's 320 exposure, position, and/or aim, imaging system's 300 settings and/or preferences, and any other suitable function/control that can be accessed and/or modified remotely. The current image from the camera 320 could be sent to the mobile device 100 so the installer can see the results and verify performance. After installation/maintenance is complete, or access is denied, the image information can be deleted to save storage cost and system complexity.

Figure 1B:
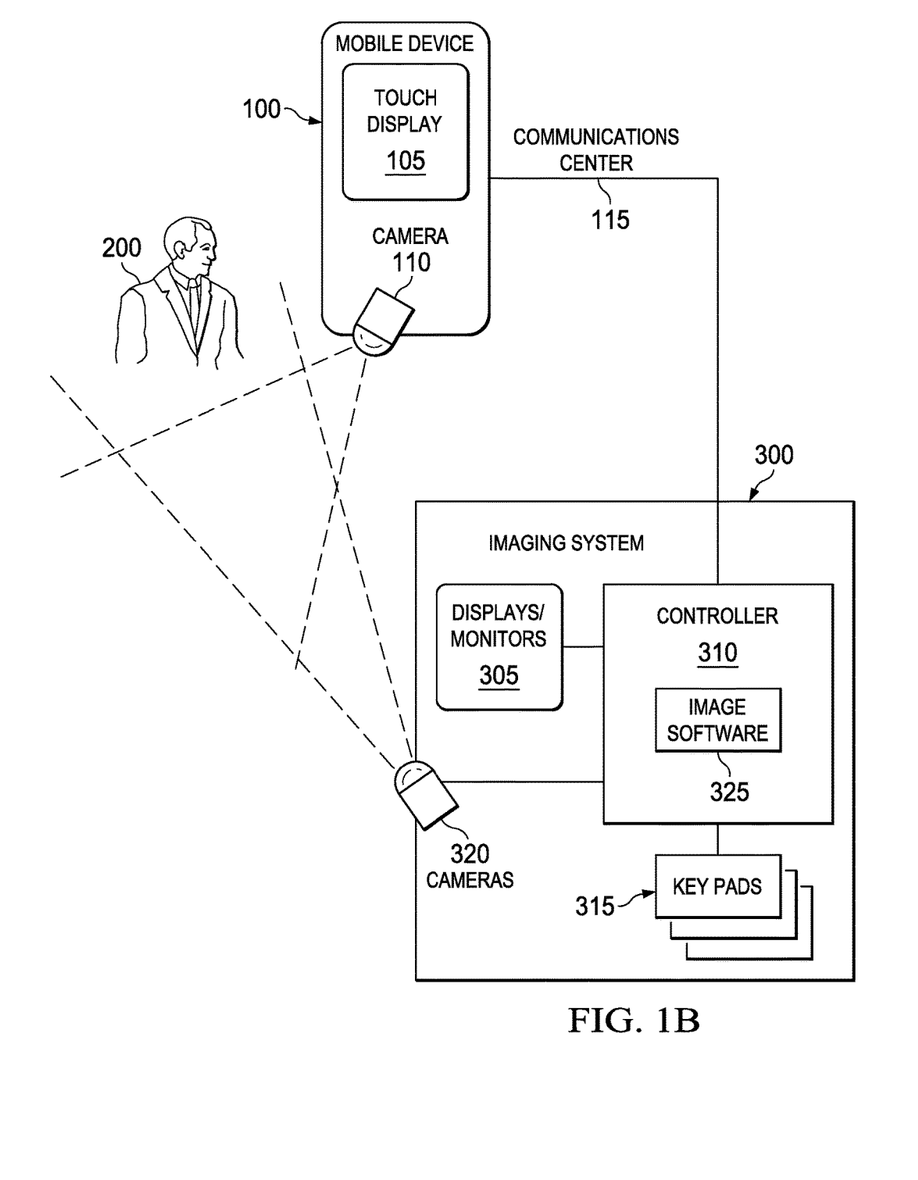
FIG. 1B illustrates an imaging system capturing different images for provisioning access to the imaging system in accordance with an embodiment.
Figure 2B:
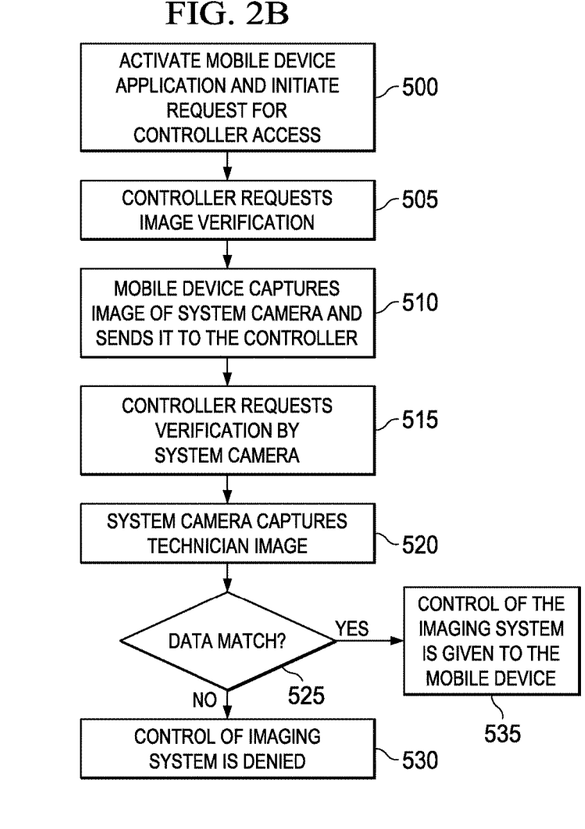
FIG. 2B illustrates a process flow diagram of a method of operating an imaging system in accordance with another embodiment.

FIG. 1B illustrates an imaging system 300 capturing different images for provisioning access to the imaging system in accordance with an embodiment and FIG. 2B illustrates a process flow of operating the imaging system in FIG. 1B in accordance with an embodiment. This embodiment is similar to the previous embodiment except that the mobile device 100 and its camera 110 are capturing an image of the system camera 320 and the system camera 320 is capturing an image of the operator. Details of this embodiment that are similar to the previous embodiment are not repeated herein.

The operator initiates a specific application on a mobile device 100 that is designed to contact the controller 310 and requests access to the imaging system 300 (step 500). The controller responds by requiring an authentication process from the operator (step 505). In this embodiment, the image that the operator captures with the mobile device 100 is an image of the system camera 320 and the operator sends that image to the controller 310 (step 510). The controller then requests verification by a specific one of the system cameras 320, which may be the system camera 320 that the operator captured in step 510 (step 515). The mobile device 100 application instructs the operator to capture an image of the operator with the specific camera 320 (step 520). The operator may utilize the touch screen to see what the specific camera 320 sees and use this to aim and capture the desired image for comparison. In some embodiments step 520 may effectively be skipped and the controller 310 uses the system camera 320 to capture the image without any intervention from the operator. In an embodiment, the image from the system camera 320 may then be compared to a stored image of the operator and/or the time the images were taken is compared to see if they fall within a programmable period (step 525). If the captured images and time period meet the threshold of acceptability, access is given to the mobile device 100 and the controls of the imaging system 300 are available on and from the mobile device 100 (step 535). If a match is not made, access is denied (step 530).

Figure 1C:
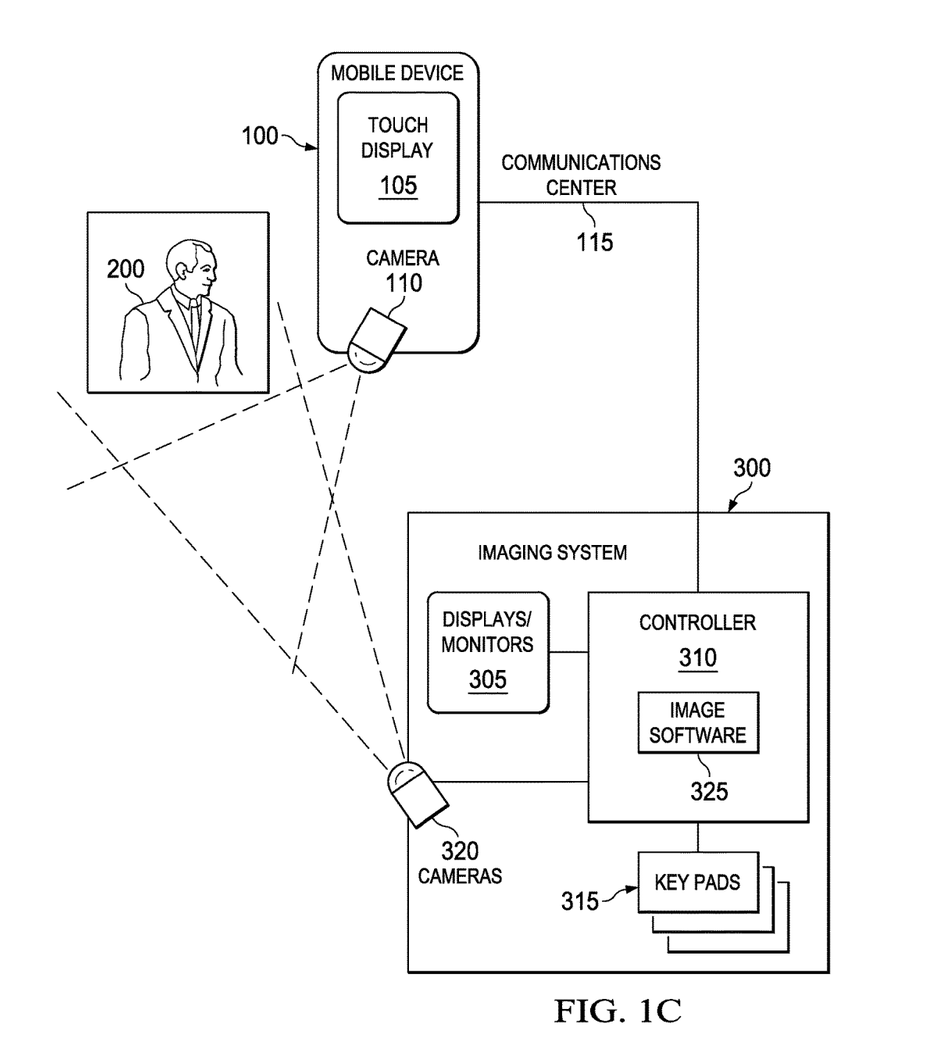
FIG. 1C illustrates an imaging system capturing different images for provisioning access to the imaging system in accordance with another embodiment.
Figure 2C:
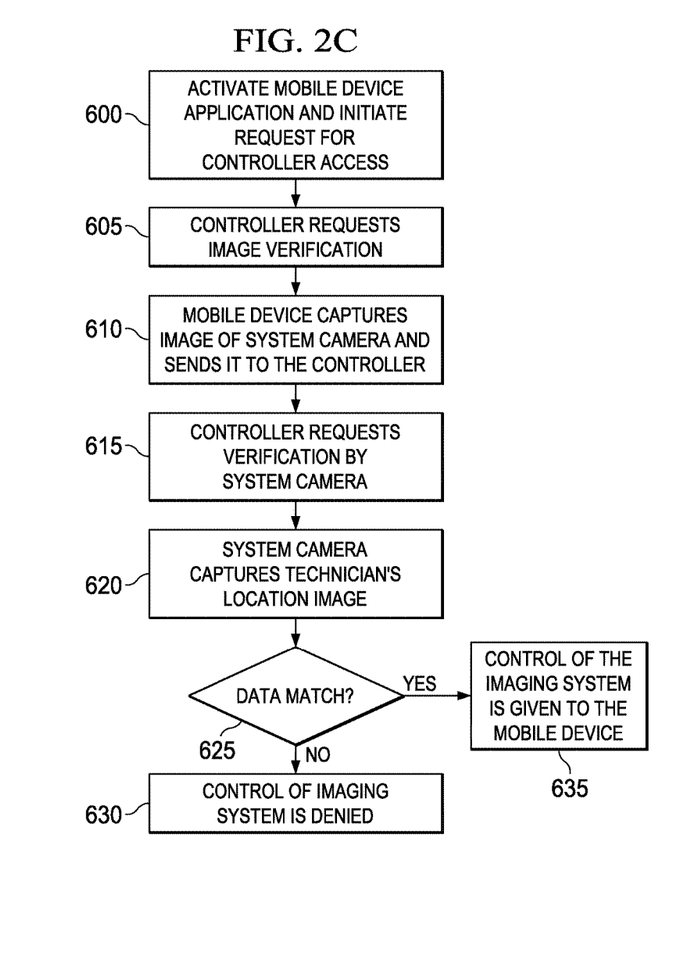
FIG. 2C illustrates a process flow diagram of a method of operating an imaging system in accordance with another embodiment.

FIG. 1C illustrates an imaging system 300 capturing different images for provisioning access to the imaging system in accordance with an embodiment and FIG. 2C illustrates a process flow of operating the imaging system in FIG. 1C in accordance with an embodiment. This embodiment is similar to the previous embodiments except that the mobile device 100 and its camera 110 are capturing an image of the system camera 320 and the system camera 320 is capturing an image of the location where the operator is located. Details of this embodiment that are similar to the previous embodiment are not repeated herein.

The operator initiates a specific application on a mobile device 100 that is designed to contact the controller 310 and requests access to the imaging system 300 (step 600). The controller responds by requiring an authentication process from the operator (step 605). In this embodiment, the image that the operator captures with the mobile device 100 is an image of the system camera 320 and the operator sends that image to the controller 310 (step 610). In some embodiments, the mobile device 100 also sends location-based data of the mobile device 100 (e.g. GPS data) to the controller so that the controller may utilize this data during the data comparison. The controller then requests verification by a specific one of the system cameras 320, which may be the system camera 320 that the operator captured in step 510 (step 615). The mobile device 100 application instructs the operator to capture an image of the location where operator is located with the specific camera 320 (step 620). The operator may utilize the touch screen to see what the specific camera 320 sees and use this to aim and capture the desired image for comparison. In some embodiments step 620 may effectively be skipped and the controller 310 uses the system camera 320 to capture the image without any intervention from the operator. In an embodiment, the image from the system camera 320 may then be compared to a stored image of the operator and/or the time the images were taken is compared to see if they fall within a programmable period (step 625). In addition, the location-based data from the mobile device may be used and compared to the image of the location where the operator is located that was captured by the system camera 320. If the captured images, location-based data, and/or time period meet the threshold of acceptability, access is given to the mobile device 100 and the controls of the imaging system 300 are available on and from the mobile device 100 (step 635). If a match is not made, access is denied (step 630).

Figure 2D:
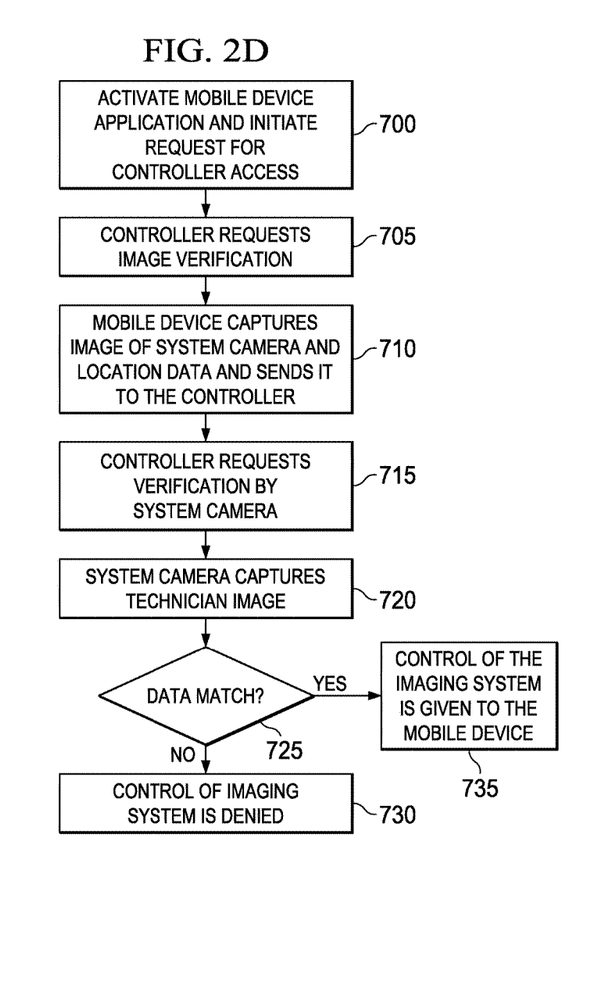
FIG. 2D illustrates a process flow diagram of a method of operating an imaging system in accordance with another embodiment.

FIG. 2D illustrates a process flow of operating the imaging system in FIG. 1C in accordance with an embodiment. This embodiment is similar to the previous embodiment except that the location-based data that the mobile device 100 sends also include orientation-based data Details of this embodiment that are similar to the previous embodiment are not repeated herein.

The orientation-based data may include the direction the mobile device 100 is facing and the azimuth of the mobile device 100. By including this information with the image captured by the mobile device 100, the controller 310 can determine a vector of the direction the mobile device 100 is facing which may allow better determination of the operator's location during the data comparison step (step 725). In addition, this orientation-based data may allow the controller 310 to better determine the location of the mobile device 100 relative to the location of the system camera 320. This extra location-based data enhances the security of the imaging system 300 as compared to the previous embodiment.

Figure 1D:
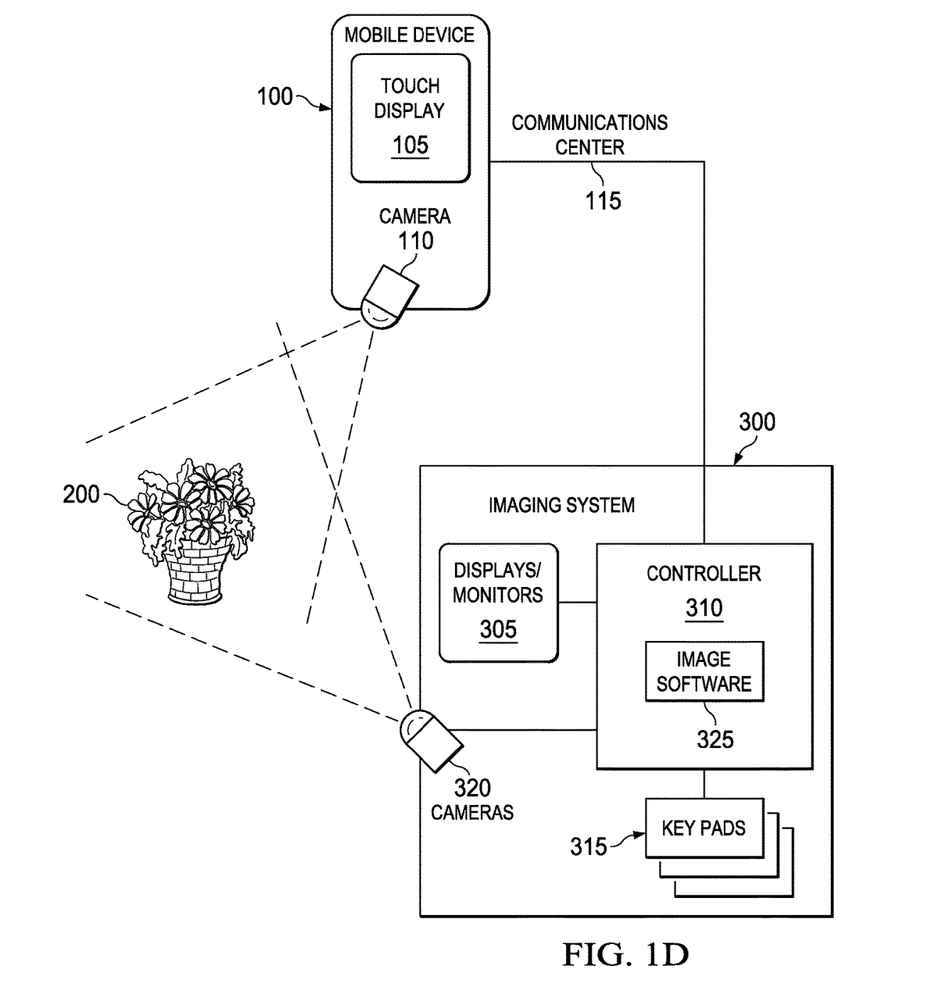
FIG. 1D illustrates an imaging system capturing similar images for provisioning access to the imaging system in accordance with another embodiment.
Figure 2E:
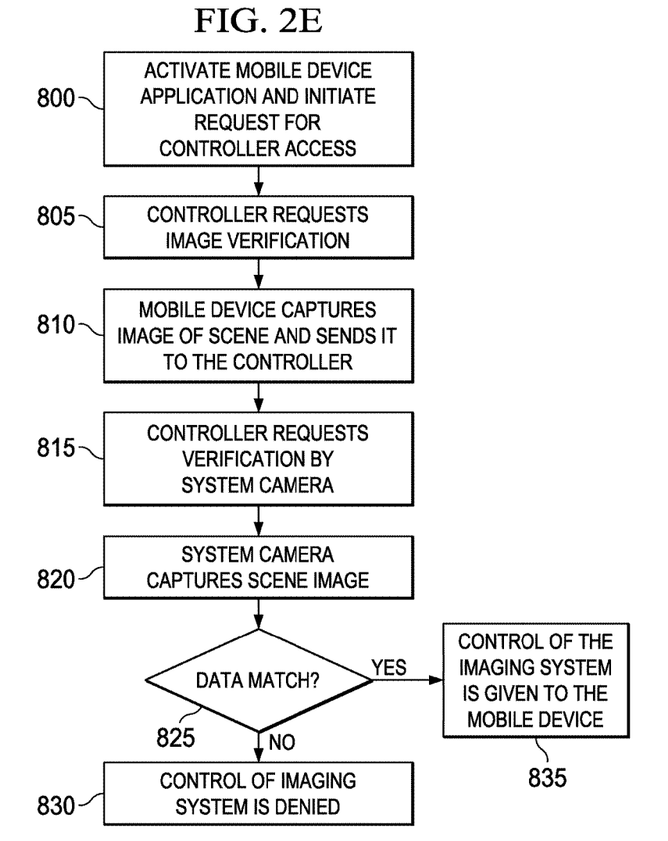
FIG. 2E illustrates a process flow diagram of a method of operating an imaging system in accordance with another embodiment.

FIG. 1D illustrates an imaging system 300 capturing similar images for provisioning access to the imaging system in accordance with an embodiment and FIG. 2E illustrates a process flow of operating the imaging system in FIG. 1D in accordance with an embodiment. This embodiment is similar to the previous embodiment in FIGS. 1A and 2A except that the mobile device 100 and its camera 110 are capturing an image of a scene 200 and the system camera 320 is capturing an image of the same scene 200. Details of this embodiment that are similar to the previous embodiment are not repeated herein.

The operator initiates a specific application on a mobile device 100 that is designed to contact the controller 310 and requests access to the imaging system 300 (step 800). The controller responds by requiring an authentication process from the operator (step 805). In this embodiment, the image that the operator captures with the mobile device 100 is an image of a scene (e.g. a tree, a building, a landscape, a parking lot, a vehicle, the like, or any identifiable structure or scene) and the operator sends that image to the controller 310 (step 810). The controller then requests verification by a specific one of the system cameras 320 (step 815). The mobile device 100 application instructs the operator to capture an image of the same scene 200 captured by the mobile device 100 with the specific camera 320 (step 820). The operator may utilize the touch screen to see what the specific camera 320 sees and use this to aim and capture the desired image for comparison. In some embodiments step 820 may effectively be skipped and the controller 310 uses the system camera 320 to capture the image without any intervention from the operator. The two captured images are compared and/or the time the images were taken is compared to see if they fall within a programmable period (step 825). If the captured images and/or time period meet the threshold of acceptability, access is given to the mobile device 100 and the controls of the imaging system 300 are available on and from the mobile device 100 (step 835). If a match is not made, access is denied (step 830).

The different embodiments described above may provide varying levels of access to the imaging system 300. For example, the embodiment described in FIGS. 1B and 2B may provide less access than the embodiment described in FIGS. 1A and 2A because FIGS. 1B and 2B utilize stored images.

In some embodiments, the controller 310 may allow the threshold of acceptability for the data comparison to have more than one threshold that provides more than one level of access. For example, if the images captured are not a high-confidence match, the timestamp of the images is not close enough, or the location data is not accurate enough, the operator may only be given limited access to the imaging system 300. This may be due to poor visibility due to weather, or because the system camera 320 is on the top of a tall building and cannot clearly capture the face of the operator, etc. However, if the data comparison is sufficient, the operator may be given full access to the imaging system 300.

Although the embodiments in FIGS. 1A-D and 2A-E illustrate a separate controller 310, in some embodiments, the imaging system 100 may not include a separate controller 310 and the mobile device 100, the system camera 320, or a combination thereof may perform the functions and steps of the controller 310.

In some embodiments, this process of provisioning access could be used to authenticate a request to remotely access to a personal computer, or between mobile devices, or any digital system with computing, imaging, and communications capabilities.

In some embodiments, the initial communication to the mobile device 100 may be initiated at the controller 310. In some embodiments, additional measures may be added to the process to increase security such as before steps 405, 505, 605, 705, and 805, the controller 310 can disconnect and contact the mobile device 100 with a new connection to avoid spoofing.

By utilizing recently captured images and data, the access provisioning of the imaging system does not require libraries of stored images and data. These captured images and data become a security nonce, which is temporary and ethereal data that is not subject to spoofing with, for example, stored images and data. The present system does not require passwords, special test tools, and other devices that could be misused, lost, stolen, or otherwise need to be maintained and managed. Furthermore, the system provides simple and secure authorization that is time-dependent and/or situation-dependent such that each access may be secured.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A system comprising:
a controller having a communication connection, the controller configured to transmit or receive content or control signals;
an imaging system comprising a first camera configured to capture a first image of a scene; and
a mobile device configured to request access to the controller, the mobile device comprising a second camera configured to capture a second image of the scene as captured by the first camera, wherein the mobile device receives remote installation and remote maintenance access to the system through the communication connection and in accordance with a result of a comparison of the first image and the second image at the controller.

2. The system of claim 1, wherein the communication connection comprises a cellular connection, a Bluetooth connection, a Wi-Fi connection, an infrared connection, or a combination thereof.

3. The system of claim 1, wherein the communication connection comprises a powerline communication connection.

4. The system of claim 1, wherein the mobile device further comprises a communication interface configured to transmit or receive content or control signals with the controller and transmit location data of the mobile device to the controller, wherein the controller is further configured to utilize the location data during the image comparison.

5. The system of claim 1, wherein the mobile device further comprises a communication interface configured to transmit or receive content or control signals with the controller and transmit orientation data to the controller, the orientation data comprising direction the mobile device is facing, azimuth of the mobile device, or a combination thereof, wherein the controller is further configured to utilize the orientation data during the image comparison.

6. The system of claim 1, wherein the controller is located locally within the system.

7. The system of claim 1, wherein the controller is located on a cloud-based system, the controller being remotely located from the system.

8. The system of claim 1, wherein the controller is located within the mobile device.

9. A method of a mobile device accessing a system, the method comprising:
attempting access of the system by the mobile device;
capturing a first scene using a first camera of the mobile device, wherein the first scene is an image of a second scene as captured by a second camera in the system;
sending the captured first scene to the system; and
receiving, at the mobile device, remote installation and remote maintenance access to the system through a communication connection and in accordance with a result of a comparison of the captured first scene from the first camera and the second scene from the second camera at a controller of the system.

10. The method of claim 9, wherein sending the captured first scene uses a cellular connection, a Bluetooth connection, a Wi-Fi connection, an infrared connection, a powerline communication connection, or a combination thereof.

11. The method of claim 9 further comprising:
sending location data of the first scene with the captured first scene to the controller.

12. The method of claim 9 further comprising:
sending time data of when the first camera captured the first scene to the controller.

13. The method of claim 9, wherein receiving authentication further comprises:
comparing the captured first scene from the first camera to the captured second scene from the second camera; and
comparing the result of the captured scene comparison to a predetermined threshold.

14. The method of claim 13 further comprising:
adjusting the predetermined threshold by an authorized user.

15. The method of claim 9, wherein receiving authentication further comprises:
comparing location data from the captured first scene from the first camera to location data from the captured second scene from the second camera; and
comparing the result of the location data comparison to a predetermined threshold.

16. The method of claim 9, wherein receiving authentication further comprises:
comparing time data from the captured first scene from the first camera to time data from the captured second scene from the second camera; and
comparing the result of the time data comparison to a predetermined threshold.

17. The method of claim 9, wherein the second scene comprises a person's face, an indoor scene, an outdoor scene, or a combination thereof.

18. The method of claim 9, wherein the mobile device is authenticated by the controller.

19. The method of claim 9, wherein the mobile device is authenticated by a component outside of the controller.

20. A method of accessing a system, the method comprising:
receiving a request to access the system by a mobile device, wherein a first camera in the system captures a first scene;

receiving a second scene captured at the system by a second camera in the mobile device, wherein the second scene is an image of the first scene as captured by the first camera; and receiving, at the mobile device, remote installation and remote maintenance access to the system through a communication connection and in accordance with a result of a comparison between the captured first scene from the first camera and the second scene from the second camera.

21. The method of claim 20, wherein receiving authentication further comprises comparing the captured first and second scenes.

22. The method of claim 21 further comprising:
transmitting the captured first scene to the mobile device, wherein the comparing the captured scenes is performed on the mobile device.

23. The method of claim 21 further comprising:
transmitting the captured second scene to a controller of the system, wherein the comparing the captured scenes is performed on the controller.

24. The method of claim 23, wherein the controller is located locally within the system.

25. The method of claim 23, wherein the controller is remotely located from the system in a cloud-based platform.

26. The method of claim 20, wherein receiving authentication further comprises comparing two sets of analytics data.

27. The method of claim 26, wherein the two sets of analytics data comprises location data, orientation data, time data, biometric data, or a combination thereof.

28. The method of claim 20, wherein the first scene is substantially the same as the second scene.

* * * * *